(12) United States Patent
Watanabe

(10) Patent No.: US 8,875,827 B2
(45) Date of Patent: Nov. 4, 2014

(54) VEHICLE

(75) Inventor: Masayuki Watanabe, Kariya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/391,882

(22) PCT Filed: Oct. 26, 2010

(86) PCT No.: PCT/JP2010/006314
§ 371 (c)(1),
(2), (4) Date: Feb. 23, 2012

(87) PCT Pub. No.: WO2012/056492
PCT Pub. Date: May 3, 2012

(65) Prior Publication Data
US 2013/0220713 A1 Aug. 29, 2013

(51) Int. Cl.
B60R 16/04 (2006.01)
B60K 11/00 (2006.01)
H01M 10/6561 (2014.01)
B60K 1/04 (2006.01)
B60L 11/18 (2006.01)
H01M 10/613 (2014.01)
B60K 1/00 (2006.01)

(52) U.S. Cl.
CPC ....... B60L 11/1874 (2013.01); H01M 10/5063 (2013.01); B60K 1/04 (2013.01); H01M 10/5004 (2013.01); Y02E 60/12 (2013.01); B60K 2001/005 (2013.01)
USPC .......................................... 180/68.5; 180/68.1

(58) Field of Classification Search
CPC ................. B60K 2001/0416; B60K 2001/005; B60L 11/1874; B60H 2001/003
USPC ................................................. 180/68.5, 68.1
See application file for complete search history.

(56) References Cited

U.S. PATENT DOCUMENTS

2005/0011692 A1* 1/2005 Takahashi et al. ........... 180/68.5
2008/0297136 A1* 12/2008 Gaboury et al. ........... 324/76.11
2009/0120702 A1* 5/2009 Yoda ............................ 180/68.1

FOREIGN PATENT DOCUMENTS

| JP | 2004-237803 | 8/2004 |
|----|-------------|--------|
| JP | 2006-40644 | 2/2006 |
| JP | 2007-112260 | 5/2007 |
| JP | 2009-252688 | 10/2009 |
| JP | 2010-149647 | 7/2010 |

* cited by examiner

Primary Examiner — Hau Phan
Assistant Examiner — Bryan Evans
(74) Attorney, Agent, or Firm — Finnegan, Henderson, Farabow, Garrett & Dunner, LLP

(57) ABSTRACT

A vehicle has an electric storage unit having a plurality of electric storage elements and outputting energy for use in running of the vehicle, a blower placed closer to the exterior of a vehicle body relative to the electric storage unit and supplying the electric storage unit with air for adjusting the temperature of the electric storage element, and a pedestal supporting the blower. The pedestal has a bend portion allowing movement of the blower to a position off the electric storage unit through deformation in response to an external force.

11 Claims, 9 Drawing Sheets

US 8,875,827 B2

VEHICLE

TECHNICAL FIELD

The present invention relates to a vehicle on which an electric storage unit and a blower for supplying the electric storage unit with air for temperature adjustment are mounted.

BACKGROUND ART

It is known that a temperature rise in a battery results in deterioration of input/output characteristics of the battery. To address this, there is a technique of supplying the battery with air for cooling to suppress the temperature rise in the battery. Specifically, a blower is driven to guide the air to the battery through an intake duct. The blower is placed at a position adjacent to the battery in some cases.

PRIOR ART DOCUMENTS

Patent Document

[Patent Document 1] Japanese Patent Laid-Open No. 2009-252688

SUMMARY OF THE INVENTION

Problems to be Solved by the Invention

When the blower is placed at the position adjacent to the battery, application of an external force to the blower may cause the blower to strike the battery. The present invention provides a technique capable of preventing a blower from striking a battery when an external force is applied to the blower.

Means for Solving the Problems

A vehicle which is a first aspect of the present invention has an electric storage unit having a plurality of electric storage elements and outputting energy for use in running of the vehicle, a blower placed closer to the exterior of a vehicle body relative to the electric storage unit and supplying the electric storage unit with air for adjusting the temperature of the electric storage element, and a pedestal supporting the blower. The pedestal has a bend portion allowing movement of the blower to a position off the electric storage unit through deformation in response to an external force, a first inclined area extending from the bend portion and inclined with respect to a plane supporting the blower, and a second inclined area inclined with respect to the plane at an inclination angle larger than that of the first inclined area.

The pedestal can move the blower above the electric storage unit through deformation of the bend portion. In a structure in which the electric storage unit and the blower are mounted on the vehicle (for example, a floor panel), the blower can be moved easily above the electric storage unit.

A vehicle which is a second aspect of the present invention has an electric storage unit having a plurality of electric storage elements and outputting energy for use in running of the vehicle, a blower placed closer to the exterior of a vehicle body relative to the electric storage unit and supplying the electric storage unit with air for adjusting the temperature of the electric storage element, and a pedestal supporting the blower. The pedestal has a bend portion allowing movement of the blower to a position off the electric storage unit through deformation in response to an external force and being bent in a shape convex toward a predetermined direction, and a protruding portion provided to be flush with the bend portion and extending in a direction different from a direction in which the bend portion extends. For example, a bead formed on a plate is used as the bend portion. The strength of the pedestal can be ensured by using the protruding portion.

The pedestal can be provided integrally with a case housing the electric storage unit. This enables the electric storage unit and the blower to be formed together as one unit, and the electric storage unit and the blower can be mounted easily on the vehicle. The plurality of electric storage elements can be placed side by side in one direction as the electric storage unit. In this case, the electric storage unit and the blower can be placed side by side in the direction in which the plurality of electric storage elements are arranged.

A device used in controlling charge and discharge of the electric storage unit can be placed between the electric storage unit and the blower. Since the pedestal moves the blower toward a position off the electric storage unit, it is also possible to prevent the blower from striking the device. For example, the electric storage unit can be placed in space formed below a seat cushion.

Effect of the Invention

According to the present invention, even when the external force applied to the vehicle acts on the blower, the blower can be moved to a position off the electric storage unit by the deformation of the bend portion of the pedestal. This can prevent the blower from striking the electric storage unit.

MODE FOR CARRYING OUT THE INVENTION

Embodiments of the present invention will hereinafter be described.

Embodiment 1

Figure 1:
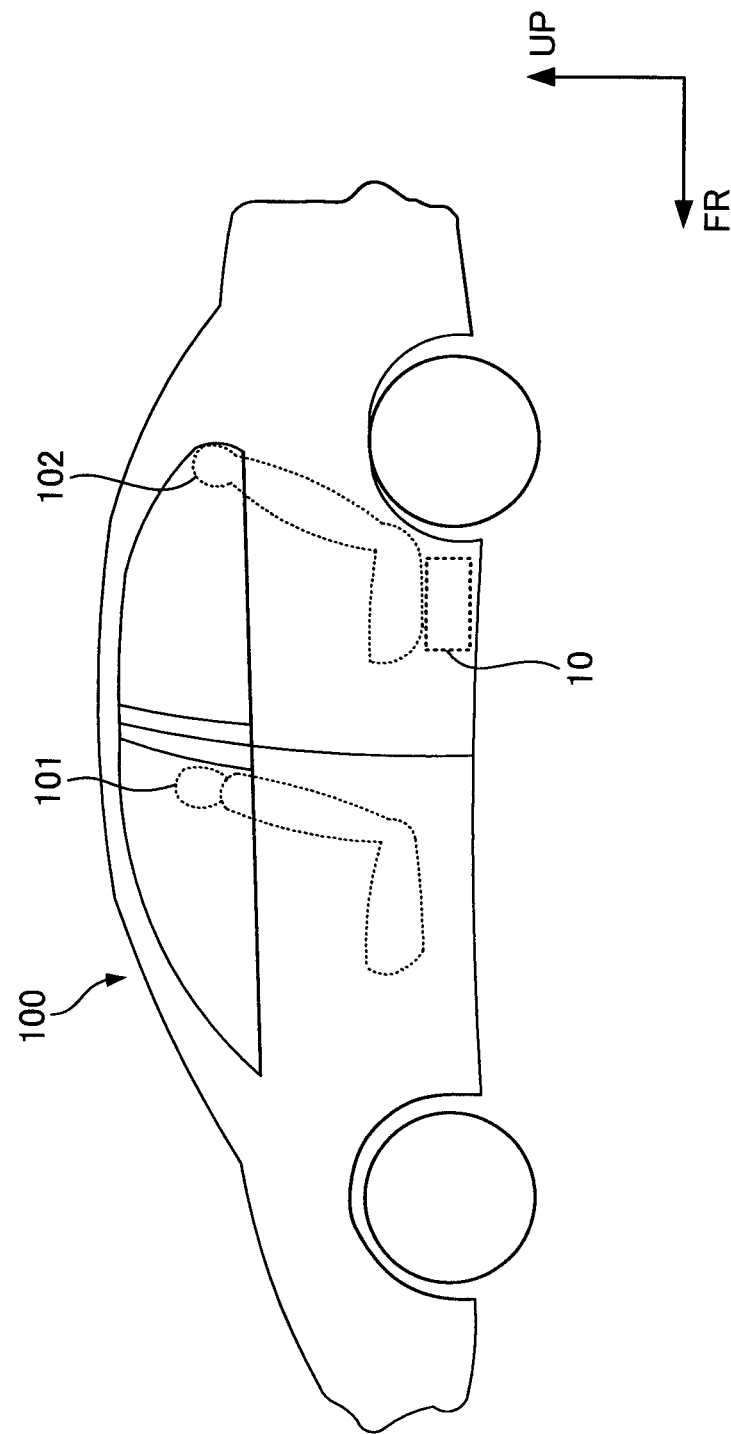
FIG. 1 is a schematic diagram showing a vehicle which is Embodiment 1.

A vehicle which is Embodiment 1 of the present invention will be described with reference to FIG. 1. FIG. 1 is a side view schematically showing the vehicle. In FIG. 1, an arrow FR indicates a direction in which the vehicle moves forward, and an arrow UP indicates an upper direction of the vehicle.

Seats 101 and 102 are placed in the interior of the vehicle 100. The interior of the vehicle refers to space where a passenger rides. The seat 101 is used as a driver's seat or a passenger's seat, for example. The seat 102 is used as a back seat. The seats 101 and 102 are fixed to a floor panel of the vehicle 100. A battery pack 10 is placed in space formed below the seat 102 and is fixed to the floor panel. In other words, the battery pack 10 is placed between a seat cushion of the seat 102 and the floor panel.

While the battery pack 10 is placed below the seat 102 in the present embodiment, the battery pack 10 can be placed in different space within the vehicle 100. For example, the battery pack 10 can be placed below the seat 101 or the battery pack 10 can be placed in luggage space located behind the seat 102.

The battery pack 10 outputs energy for use in running of the vehicle 100. There is a hybrid vehicle or an electric vehicle as the vehicle 100. The hybrid vehicle is a vehicle which includes not only the battery pack 10 but also another power source such as a fuel cell or an internal combustion engine as the power source for running of the vehicle 100. The electric vehicle is a vehicle which includes only the battery pack 10 as the power source of the vehicle 100.

The battery pack 10 is connected to a motor generator. The motor generator can generate kinetic energy for running of the vehicle 100 upon reception of the power from the battery pack 10. The motor generator is connected to wheels, and the kinetic energy generated by the motor generator is transferred to the wheels. When decelerating or stopping the vehicle 100, the motor generator converts the kinetic energy generated in braking of the vehicle into electric energy. The electric energy generated by the motor generator can be stored in the battery pack 10.

A DC/DC converter or an inverter can be placed on a current path between the battery pack 10 and the motor generator. When the DC/DC converter is used, the output voltage from the battery pack 10 can be boosted and supplied to the motor generator, or the voltage from the motor generator can be dropped and supplied to the battery pack 10. When the inverter is used, the direct-current power output from the battery pack 10 can be converted into alternating-current power, and an alternating-current motor can be used as the motor generator.

Figure 2:
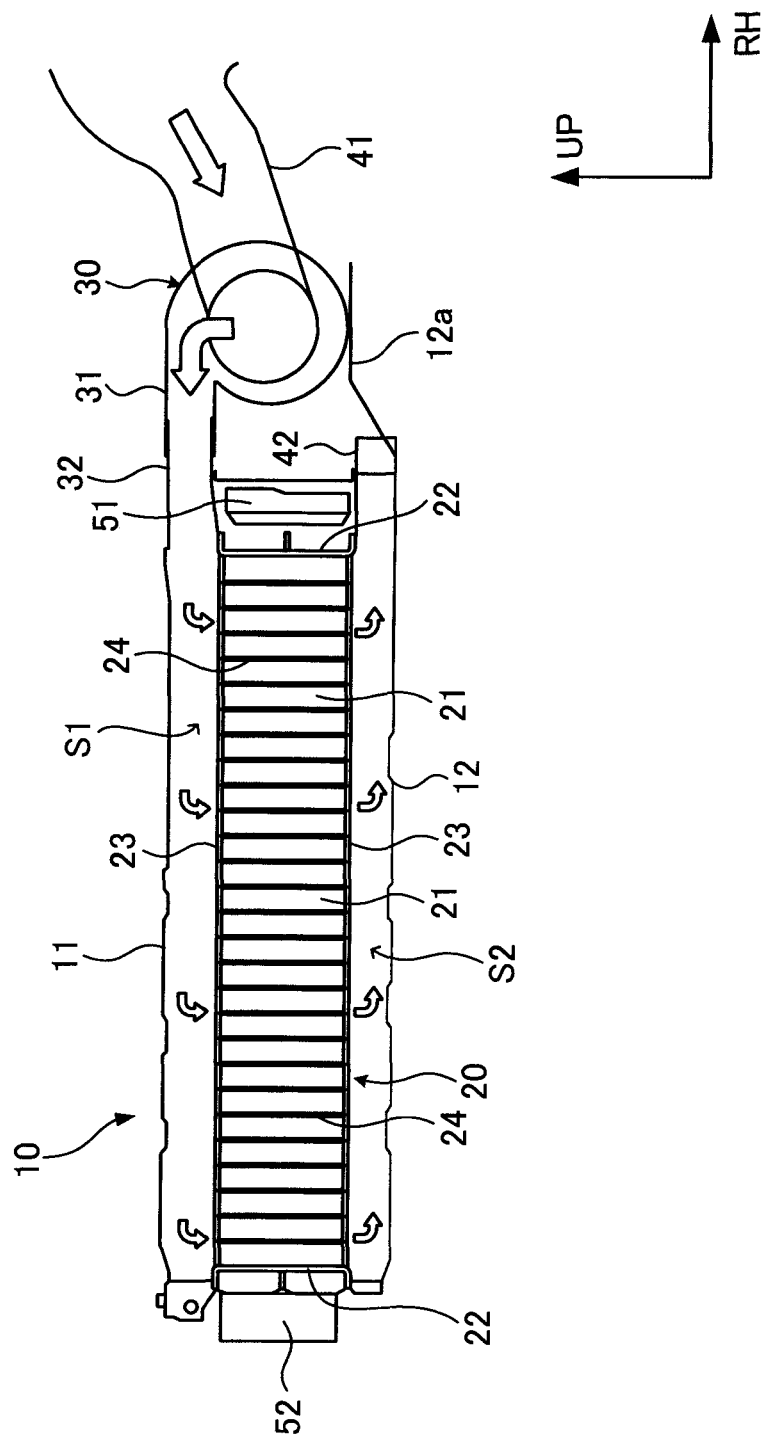
FIG. 2 is a schematic diagram showing a battery pack and a blower in Embodiment 1.

Next, the configuration of the battery pack 10 will be described with reference to FIG. 2. FIG. 2 is a diagram showing the battery pack 10 and a mechanism for supplying the battery pack 10 with air for temperature adjustment. In FIG. 2, an arrow RH indicates a horizontal direction of the vehicle 100 and points to the right when a passenger faces toward the forward direction FR of the vehicle 100.

The battery pack 10 has an upper case 11 and a lower case 12. A battery stack 20 is placed in space surrounded by the upper case 11 and the lower case 12. The battery stack 20 corresponds to an electric storage unit in the present invention. The battery stack 20 has a plurality of cells 21, and the plurality of cells 21 are arranged in one direction (the direction indicated by the arrow RH). The cell 21 corresponds to an electric storage element in the present invention. The plurality of cells 21 are connected electrically in series through a bus bar. It should be noted that the battery stack 20 may include a plurality of cells 21 connected electrically in parallel.

In the present embodiment, a so-called square-type cell is used as the cell 21. The square-type cell 21 has a plane orthogonal to the direction in which the plurality of cells 21 are arranged. A secondary battery such as a nickel metal hydride battery or a lithium-ion battery can be used as the cell 21. Instead of the secondary battery, an electric double layer capacitor (capacitor) can be used.

While the plurality of cells 21 are arranged in one direction in the present embodiment, the present invention is not limited thereto. Specifically, two or more cells can constitute a single battery module, and a plurality of battery modules can be arranged in one direction (the direction indicated by the arrow RH). The plurality of cells included in one battery module can be connected electrically in series.

A pair of end plates 22 are placed at both ends of the battery stack 20 in the direction of the arrow RH. The pair of end plates 22 are placed to put the plurality of cells 21 constituting the battery stack 20 sandwiched therebetween and are used to apply a restraint force to the plurality of cells 21. The restraint force refers to a force for putting the cells 21 sandwiched in the direction of the arrow RH. The restraint force applied to the cells 21 can suppress expansion of the cell 21 to prevent deterioration of input/output characteristics of the cells 21.

Specifically, both ends of a restraint band 23 extending in the direction of the arrow RH are connected to the pair of end plates 22. This allows the pair of end plates 22 to apply the restraint force to the plurality of cells 21. The restraint band 23 is placed on an upper face and a lower face of the battery stack 20. The position to place the restraint band 23 can be set as appropriate as long as both ends of the restraint band 23 are connected to the pair of end plates 22. For example, the restraint band 23 can be placed on both side faces of the battery stack 20 in the direction of the arrow FR (in other words, the direction orthogonal to the sheet of FIG. 2).

A spacer 24 is placed between the adjacent two of the cells 21. The spacer 24 is used for forming space between the two cells 21. The spacer 24 can be formed of insulating material such as resin. The space formed by the spacer 24 serves as space through which the air for adjusting the temperature of the cell 21 is moved. Arrows shown in FIG. 2 indicate the moving directions of the air (by way of example).

In the present embodiment, an intake path S1 is formed on the upper face of the battery stack 20 and an exhaust path S2 is formed on the lower face of the battery stack 20. The intake path S1 is formed by the upper face of the battery stack 20 and the upper case 11. The exhaust path S2 is formed by the lower face of the battery stack 20 and the lower case 12.

An intake duct 32 is connected to the intake path S1 of the battery pack 10. The intake duct 32 is connected to a duct 31 of a blower 30. An intake duct 41 is connected to the blower 30, and an intake port is provided at an end portion of the intake duct 41. The intake port of the intake duct 41 faces the interior of the vehicle. When the blower 30 is driven, the air in the interior of the vehicle is taken into the intake duct 41.

The air taken into the intake duct 41 passes through the duct 31 of the blower 30 and the intake duct 32, and enters the intake path S1. The air moved into the intake path S1 enters the space formed by the spacer 24 and is moved from the upper face to the lower face of the battery stack 20.

The air comes into contact with an outer face of the cell 21, and the heat exchange is performed between the air and the cell 21. For example, when the cell 21 generates heat due to charge and discharge or the like, air for cooling is brought into contact with the cell 21 to allow suppression of a temperature rise in the cell 21. In contrast, when the cell 21 is excessively cooled, air for heating is brought into contact with the cell 21 to allow suppression of a temperature drop in the cell 21.

The air in the interior of the vehicle has a temperature suitable for the temperature adjustment of the cell 21 by an air conditioner or the like mounted on the vehicle 100. Thus, when the air in the interior of the vehicle is supplied to the cell 21, the temperature adjustment of the cell 21 can be performed. The adjustment of the temperature of the cell 21 can suppress the deterioration of the input/output characteristics of the cell 21.

After the heat exchange between the air and the cell 21 is performed, the air is moved to the exhaust path S2. Since an exchange duct 42 is connected to the exchange path S2, the air moved to the exhaust path S2 is guided to the exhaust duct 42. The exhaust duct 42 moves the air to the outside of the battery pack 10. For example, the exhaust duct 42 can discharge the air to the outside of the vehicle.

A portion of the lower case 12 (hereinafter referred to as a pedestal) 12a extends in the direction of the arrow RH, and the blower 30 is fixed to the pedestal 12a. Thus, in the state in which the blower 30 is attached to the pedestal 12a (the lower case 12), the battery pack 10 can be mounted on the vehicle 100. In other words, the battery pack 10 and the blower 30 can be handled together as one unit, and the battery pack 10 and the blower 30 can be easily mounted on the vehicle 100.

A monitor unit 51 is placed between the blower 30 and the battery stack 20. The monitor unit 51 monitors the voltage and the current in the battery stack 20. Specifically, a plurality of voltage sensors are connected to the battery stack 20, and the detection result of each of the voltage sensors is output to the monitor unit 51. The voltage sensor can detect the voltage in each cell 21. When the plurality of cells 21 constituting the battery stack 20 are divided into a plurality of blocks, the voltage sensor can detect the voltage in each block. Each block consists of a plurality of cells 21. A current sensor is connected to the battery stack 20, and the detection result of the current sensor is output to the monitor unit 51.

The information monitored by the monitor unit 51 is used for controlling the charge and discharge of the battery stack 20. For example, when the voltage value (detected value) of the cell 21 reaches a preset upper limit, the charge and discharge of the battery stack 20 can be inhibited or suppressed. For suppressing the charge and discharge of the battery stack 20, the upper limit of the power value used in controlling the charge and discharge can be changed so that the limit is lowered.

A relay 52 is placed on the side of the battery stack 20 opposite to the side where the monitor unit 51 is placed. In other words, the monitor unit 51 and the relay 52 can be placed at the positions between which the battery stack 20 is sandwiched in the direction of the arrow RH. When the relay 52 is ON, it allows the charge and discharge of the battery stack 20. When the relay 52 is OFF, it inhibits the charge and discharge of the battery stack 20.

Figure 3:
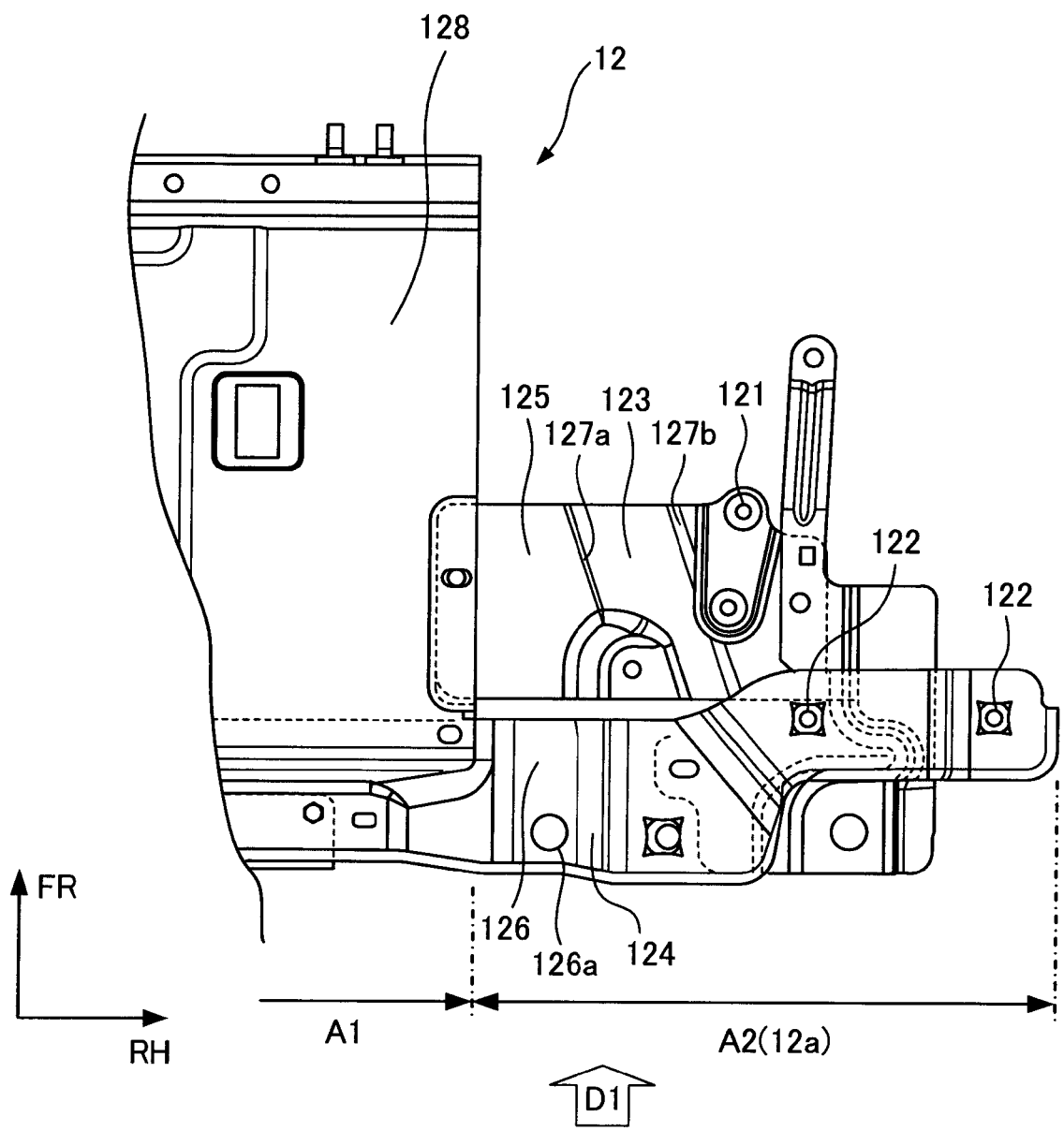
FIG. 3 is a top view showing (a portion of) a lower case in Embodiment 1.
Figure 4:
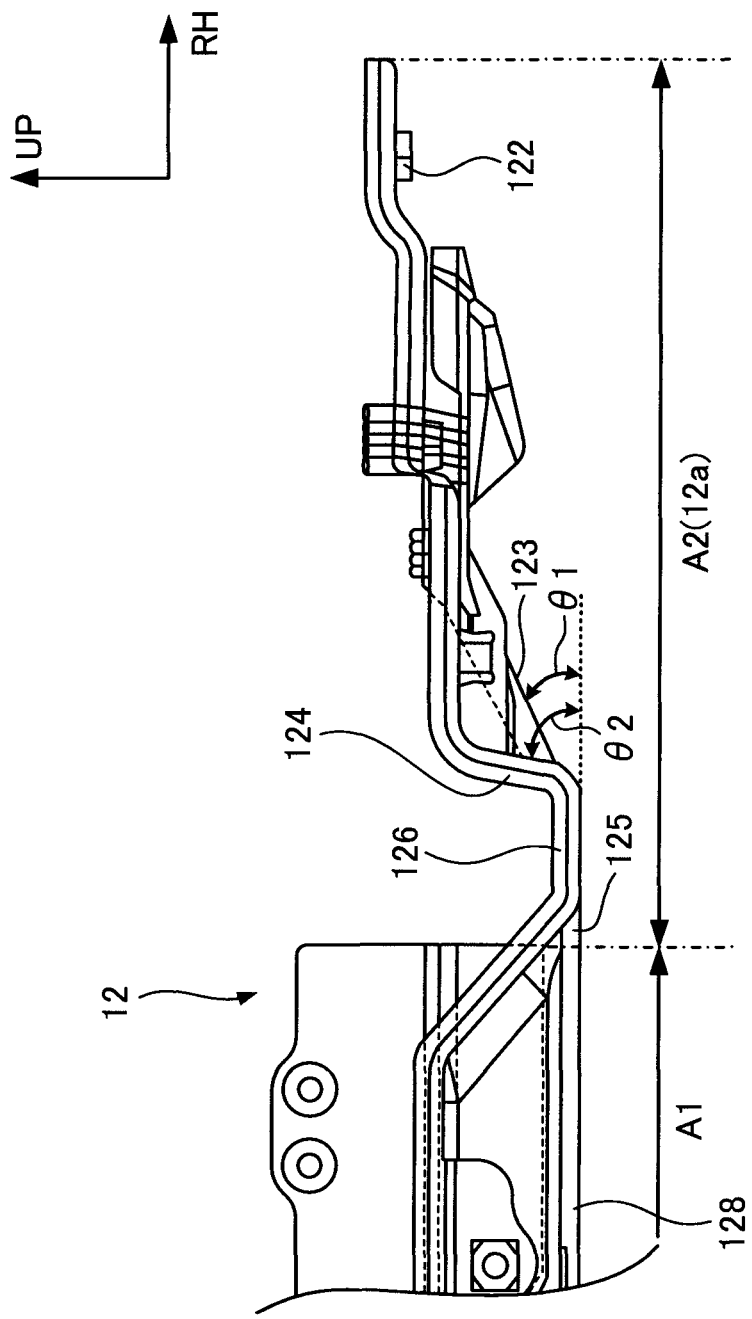
FIG. 4 is a side view showing (a portion of) the lower case when viewed from a direction indicated by an arrow D1 in FIG. 3.
Figure 5:
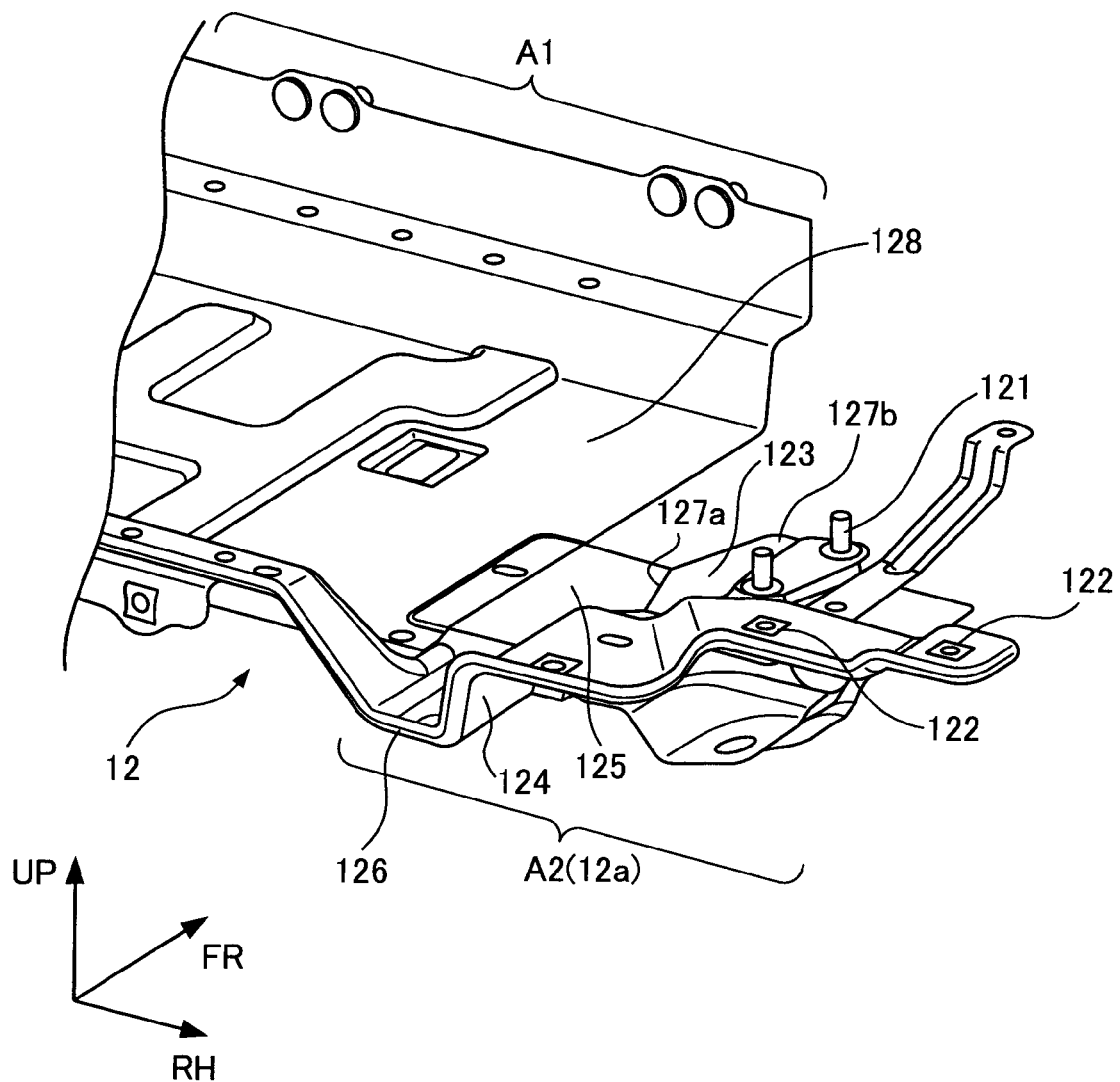
FIG. 5 is a perspective view showing the outer appearance of (a portion of) the lower case in Embodiment 1.

Next, the specific configuration of the lower case 12 (mainly the pedestal 12a) will be described with reference to FIGS. 3 to 5. FIG. 3 is a top view of the lower case 12 (mainly the pedestal 12a). FIG. 4 is a diagram showing the lower case 12 viewed from a direction indicated by an arrow D1 in FIG. 3. FIG. 5 is a perspective view showing the outer appearance of the lower case 12 (mainly the pedestal 12a).

The lower case 12 has a first area A1 and a second area A2. The first area A1 is the area where the battery stack 20 and the monitor unit 51 are placed. The second area A2 is the area where the blower 30 is placed, and corresponds to the pedestal 12a. The pedestal 12a has attachment portions 121 and 122 for attaching the blower 30. The positions of the attachment portions 121 and 122 can be set as appropriate. It is only required to fix the blower 30 to the pedestal 12a.

The pedestal 12a has a first inclined area 123 and a second inclined area 124. The first inclined area 123 and the second inclined area 124 are inclined with respect to an axis along the direction of the arrow RH and have surfaces opposite to the battery stack 20 in the direction of the arrow RH.

A first bottom area 125 of the pedestal 12a connects to the first inclined area 123 and is located to be flush with a bottom portion 128 in the first area A1. The first inclined area 123 and the first bottom area 125 connect to each other through a bend portion 127a and correspond to a plane portion in the present invention. The surface on which the attachment portion 121 is provided and the first inclined area 123 connect to each other through a bend portion 127b. The bottom portion 128 forms part of the exhaust path S2. A second bottom area 126 of the pedestal 12a connects to the second inclined area 124 and is located to be flush with the bottom portion 128 in the first area A1.

The first bottom area 125 and the second bottom area 126 are located below the attachment portions 121 and 122. The second bottom area 126 is provided with an opening portion 126a, and the opening portion 126a is used for fixing the seat 102 to the floor panel of the vehicle 100. Specifically, a bolt for fixing the seat 102 to the floor panel passes through the opening portion 126a. This can fix the lower case 12 (the battery pack 10) and the seat 102 to the floor panel simultaneously.

Figure 6:
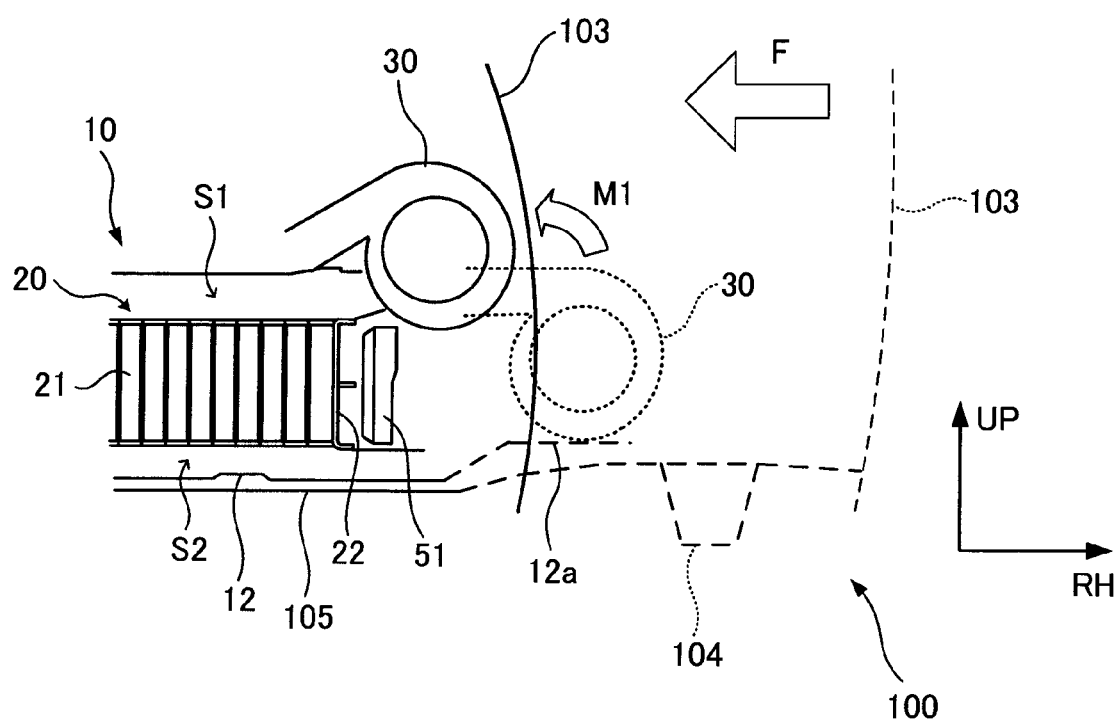
FIG. 6 is a diagram showing the movement track of the blower on which an external force acts in Embodiment 1.

The pedestal 12a has the function of moving the blower 30 to a position off the battery stack 20 when an external force applied to the vehicle 100 acts on the blower 30. The operation when the external force acts on the blower 30 will be described with reference to FIG. 6. FIG. 6 is a diagram when an external force F acts on the vehicle 100. Dotted lines represent the state before the external force F acts, and solid lines represent the state after the external force F acts. The external force F acts in a left-right direction of the vehicle 100.

The example shown in FIG. 6 shows the state in which the external force F acts on a side door 103 of the vehicle 100. The floor panel 105 of the vehicle 100 is fixed to a side member 104 extending in the front-back direction of the vehicle 100 (the direction indicated by the arrow FR). As described above, the battery pack 10 is fixed to the floor panel 105.

When the external force F acts on the side door 103, deformation of the side door 103 and deformation of the floor panel 105 bring the side door 103 closer to the blower 30. Since the blower 30 is placed closer to the side door 103 than the battery stack 20, the external force F may act on the blower 30 through the side door 103.

Since the pedestal 12a has lower rigidity than the blower 30, the action of the external F on the blower 30 deforms the pedestal 12a more easily than the blower 30. The pedestal 12a has the first inclined area 123 and thus is deformed in the direction in which the first inclined area 123 comes closer to the first bottom area 125. In addition, the pedestal 12a has the second inclined area 124 and thus is deformed in the direction in which the second inclined area 124 comes closer to the second bottom area 126.

The deformation of the pedestal 12a moves the attachment portions 121 and 122 upward from the initial position. The initial position refers to the position of the pedestal 12a before the external force F acts. In response to the movement of the attachment portions 121 and 122, the blower 30 moves in a direction indicated by an arrow M1 in FIG. 6. In other words, the blower 30 moves to a position off the monitor 51 and the battery stack 20. Since the battery stack 20 and the blower 30 are spaced in the direction of the arrow RH, the blower 30 can be moved to the position off the battery stack 20 only by the deformation of the pedestal 12a.

The movement of the blower 30 to the position off the battery stack 20 can prevent the blower 30 from striking the monitor unit 51 or the battery stack 20. Since the duct 31 of the blower 30 is simply fitted into the intake duct 32, the duct 31 is released from the intake duct 32 in response to the movement of the blower 30 in the direction of the arrow M1.

In the present embodiment, the first inclined area 123 and the second inclined area 124 have different inclination angles (angles with respect to a horizontal plane). Specifically, as shown in FIG. 4, the inclination angle $\theta 1$ of the first inclined area 123 is smaller than the inclination angle $\theta 2$ of the second inclined area 124.

The inclination angle $\theta 2$ is set to a value closer to 90 degrees than the inclination angle $\theta 1$. Setting the inclination angle $\theta 2$ in this manner can ensure the strength of the pedestal 12a. Since the blower 30 is mounted on the pedestal 12a, the pedestal 12a needs to have the strength in the direction in which the weight of the blower 30 acts.

The inclination angle $\theta 1$ is set to be a value smaller than the inclination angle 2. Setting the inclination angle $\theta 1$ in this manner can deform the pedestal 12a more easily. The inclination angles $\theta 1$ and $\theta 2$ of the first inclined area 123 and the second inclined area 124, respectively, are set to the different values in this manner, so that the strength of the pedestal 12a can be ensured and the pedestal 12a can be deformed easily in the predetermined direction.

Appropriately setting the inclination angles $\theta 1$ and $\theta 2$ of the first inclined area 123 and the second inclined area 124 and the sizes of the first inclined area 123 and the second inclined area 124 enables the appropriate setting of the strength of the pedestal 12a and the ease of deformation of the pedestal 12a. In addition, the movement track of the blower 30 can be changed in accordance with the orientations of the first inclined area 123 and the second inclined area 124.

While the intake path S1 is provided on the upper face of the battery stack 20 and the exhaust path S2 is provided on the lower face of the battery stack 20 in the present embodiment, the present invention is not limited thereto. It is only required to provide the intake path and the exhaust path at the positions between which the battery stack is sandwiched. For example, the exhaust path can be provided on the upper face of the battery stack 20 and the intake path can be provided on the lower face of the battery stack 20. Alternatively, the intake path and the exhaust path can be provided on both side faces of the battery stack 20 in the direction of the arrow FR. The positions to place the intake duct and the exhaust duct can be determined depending on the positions of the intake path and the exhaust path.

While the blower 30 is placed on the path for supplying the battery stack 20 with the air in the present embodiment, the present invention is not limited thereto. Specifically, the blower 30 can be placed on the path for discharging the air from the battery stack 20. In this case, the air in the interior of the vehicle can also be taken into the intake duct 41 by driving the blower 30.

While the intake duct 32 and the exhaust duct 42 are connected to the one end face of the battery pack 10 in the direction of the arrow RH in the present embodiment, the present invention is not limited thereto. Specifically, it is only required that the air for temperature adjustment can be supplied to the space where the battery stack 20 is housed and that the air after the temperature adjustment can be discharged from the space where the battery stack 20 is housed. For example, the intake duct can be connected to one end face of the battery pack 10 in the direction of the arrow RH (the side of one end plate 22) and the exhaust duct can be connected to the other end face of the battery pack 10 in the direction of the arrow RH (the side of the other end plate 22).

While the battery pack 10 and the blower 30 are placed side by side in the left-right direction of the vehicle 100 (the direction of the arrow RH) in the present embodiment, the present invention is not limited thereto. It is only required that the blower 30 can be moved to a position off the battery pack 10 (the battery stack 20) when an external force acts on the blower 30. Thus, the present invention is applicable to a configuration in which the battery pack 10 and the blower 30 are placed side by side in the running direction of the vehicle 100 (the direction of the arrow FR).

For example, in a configuration in which the blower 30 is placed in the rear of the vehicle 100, the blower 30 can be moved to a position off the battery pack 10 (battery stack 20) when an external force acts on the blower 30 from the rear of the vehicle 100.

While the battery stack 20 and the blower 30 are placed side by side in the direction in which the plurality of cells 21 are arranged in the present embodiment, the present invention is not limited thereto. The present invention is applicable to any configuration in which the battery stack 20 and the blower 30 are placed side by side. Specifically, the present invention is applicable to a configuration in which the battery stack 20 and the blower 30 are placed side by side in a direction different from the arrangement direction of the plurality of cells 21.

While the monitor unit 51 is placed between the battery stack 20 and the blower 30 in the present embodiment, the present invention is not limited thereto. A device used for controlling the charge and discharge of the battery stack 20 can be placed in the space formed between the battery stack 20 and the blower 30. Examples of the device include not only the monitor unit 51 but also the relay 52, a voltage sensor, a current sensor, and a temperature sensor. The temperature sensor is used for detecting the temperature of the battery stack 20, and the detection result of the temperature sensor is used for controlling the charge and discharge of the battery stack 20.

On the other hand, the monitor unit 51 can be placed in space different from the space formed between the battery stack 20 and the blower 30 and the battery stack 20 and the blower 30 can be placed side by side. In this configuration, the blower 30 can also be moved to a position off the battery stack 20 by the deformation of the pedestal 12a.

Embodiment 2

Figure 7:
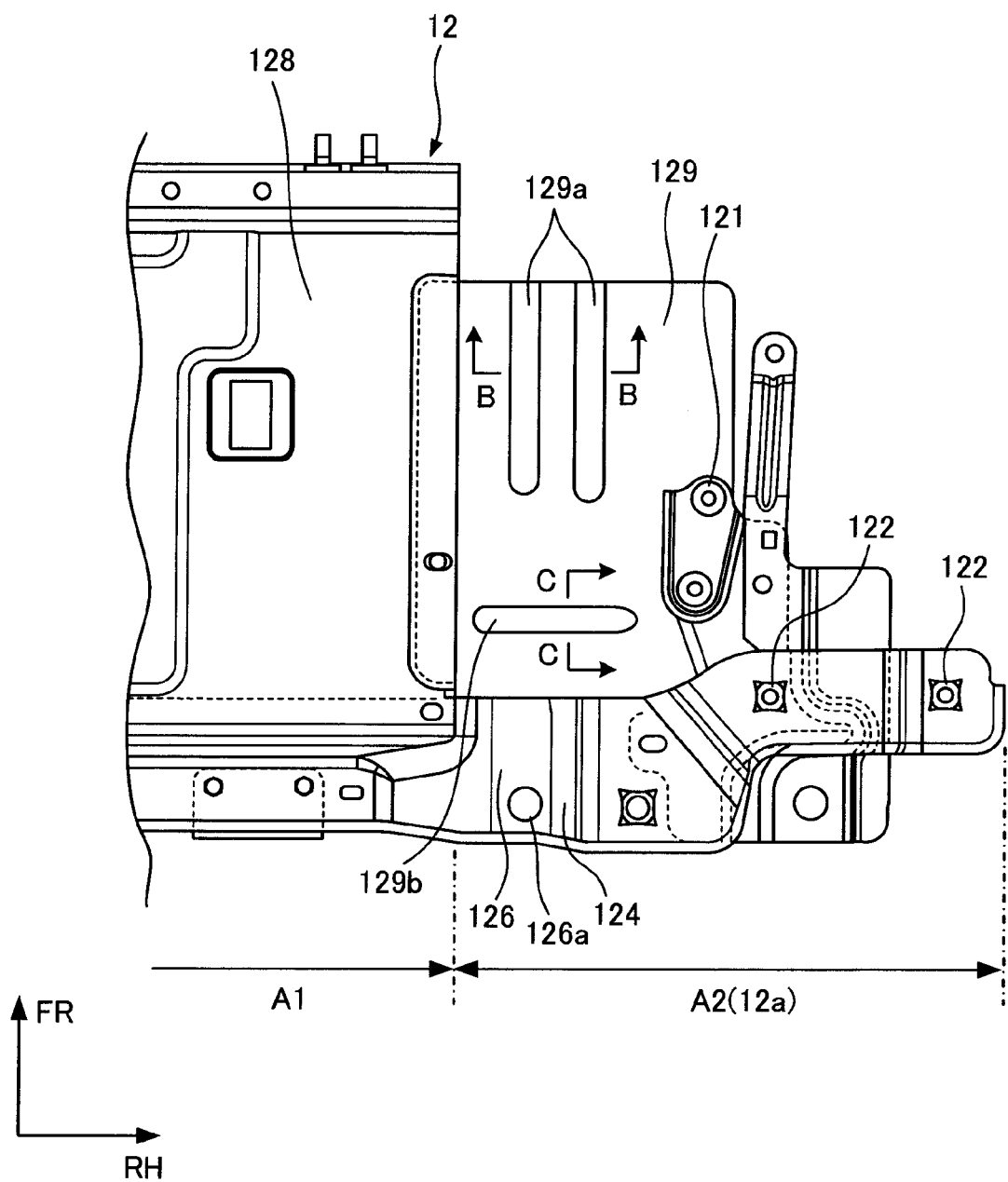
FIG. 7 is a top view showing (a portion of) a lower case in Embodiment 2.
Figure 8:
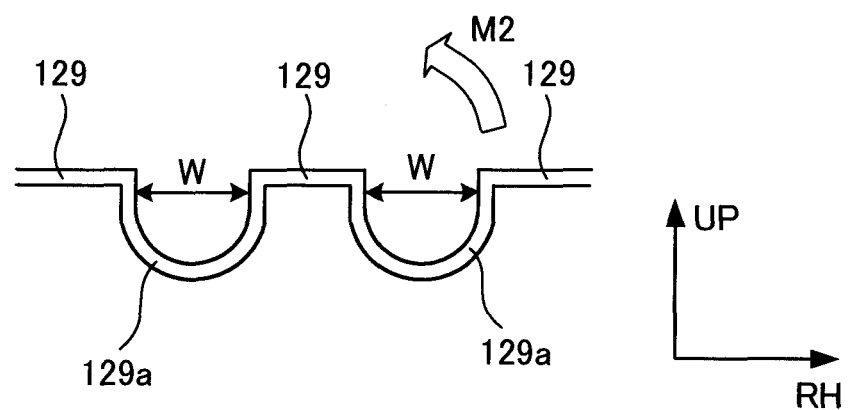
FIG. 8 is a section view taken along a line B-B in FIG. 7.
Figure 9:
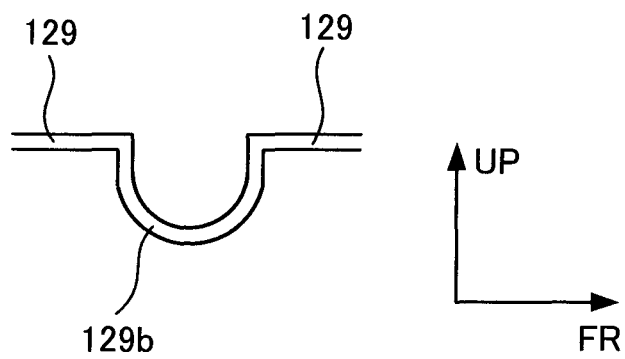
FIG. 9 is a section view taken along a line C-C in FIG. 7.

Embodiment 2 of the present invention will be described with reference to FIGS. 7 to 9. FIG. 7 is a top view showing a portion (mainly a pedestal 12a) of a lower case 12 in the present embodiment. FIG. 8 is a section view taken along a line B-B in FIG. 7. FIG. 9 is a section view taken along a line C-C in FIG. 7. Members having the same functions as those of the members described in Embodiment 1 are designated with the same reference numerals and detailed description thereof is omitted. In the following, different points from those in Embodiment 1 will be mainly described.

The pedestal 12a in the present embodiment has a second inclined area 124 and a second bottom area 126 as in Embodiment 1. The pedestal 12a has a plate 129 which is located to be flush with a bottom portion 128 in a first area A1. The plate 129 has first beads 129a and a second bead 129b. In the present embodiment, two first beads 129a and one second bead 129b are provided. The first beads 129a correspond to the bend portion in the present invention. The second bead 129b corresponds to a protruding portion in the present invention.

The first bead 129a extends in a direction indicated by an arrow FR as shown in FIG. 7 and is bent to be convex downward as shown in FIG. 8. The second bead 129b extends in a direction indicated by an arrow RH as shown in FIG. 7 and is bent to be convex downward as shown in FIG. 9. The direction in which the first bead 129a extends is orthogonal to the direction in which the second bead 129b extends.

When the external force F (see FIG. 6) described in Embodiment 1 is applied to a blower 30, the plate 129 is bent relative to the first bead 129a. Specifically, the first bead 129a is deformed to reduce a spacing W of a concave portion formed by the first bead 129a. Since the first bead 129a is convex downward, attachment portions 121 and 122 can be displaced upward. This can move the blower 30 above the battery pack 10 as in Embodiment 1.

In the present embodiment, the second bead 129b can be provided to ensure the strength of the plate 129. Since the second bead 129b extends in the direction orthogonal to the direction in which the first bead 129a extends, the second bead 129b can prevent easy bending of the plate 129 along the first bead 129a. While the second bead 129b is formed in the shape convex downward in the present embodiment, it can be formed in a shape convex upward.

The positions to provide the first bead 129a and the second bead 129b can be set as appropriate. When one end of the first bead 129a is extended to the outer edge of the plate 129 as in the present embodiment, the plate 129 can be deformed easily when the external force F is applied to the blower 30.

The numbers of the first bead 129a and the second bead 129b can be set as appropriate. In view of the ease of deformation of the plate 129 and the strength of the plate 129, the numbers of the first bead 129a and the second bead 129b can be set. While the second bead 129b is used for ensuring the strength of the plate 129 in the present embodiment, the present invention is not limited thereto. For example, a rib (corresponding to the protruding portion) protruding upward (or downward) from the plate 129 can be used instead of the second bead 129b. This rib can be formed along the second bead 129b.

While each of the first bead 129a and the second bead 129b has a curvature as shown in FIGS. 8 and 9, the present invention is not limited thereto. It is only required that the first bead 129a should bend a portion of the plate 129 and the bent portion should protrude downward. For example, the first bead 129a can be constituted by combining two inclined surfaces (planes). The same applies to the second bead 129b, and it is only required that a portion of the plate 129 should be bent and the bent portion should protrude downward or upward.

While the direction in which the first bead 129a extends is orthogonal to the direction in which the second bead 129b extends in the present embodiment, the present invention is not limited thereto. Specifically, it is only required that the direction in which the first bead 129a extends should not be parallel with the direction in which the second bead 129b extends. It is only required that the first bead 129a can deform the pedestal 12a to which the external force F is applied and that the second bead 129b can ensure the strength of the plate 129.

While the blower 30 is moved above the battery pack 10 in Embodiments 1 and 2 described above, the present invention is not limited thereto. In other words, it is only required that the blower 30 can be moved to a position where the blower 30 can avoid striking the battery pack 10.

Figure 10:
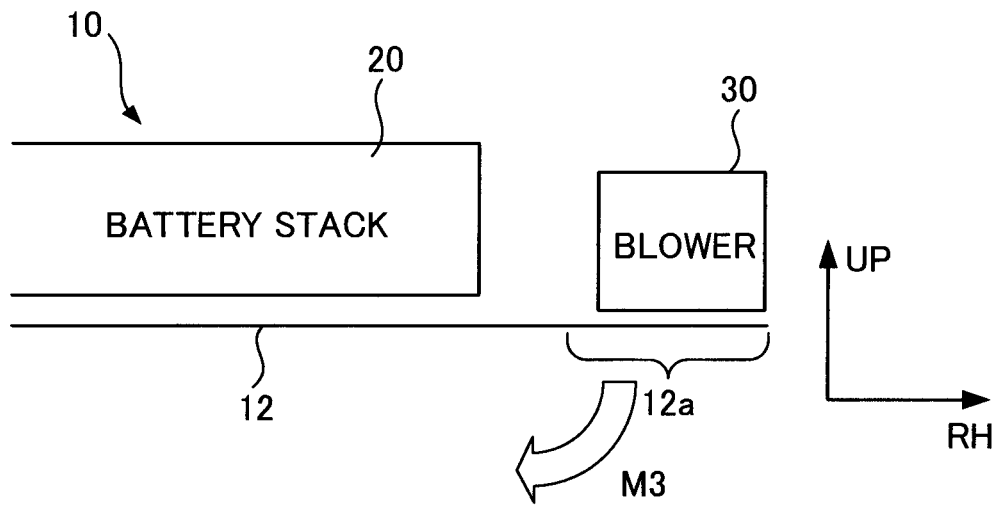
FIG. 10 is a schematic diagram showing a structure for retracting the blower from the battery pack in a modification.

For example, when space for retracting the blower 30 is provided below the battery pack 10 as shown in FIG. 10, the pedestal 12a can be deformed in a direction indicated by an arrow M3 to retract the blower 30 below the battery pack 10.

Figure 11:
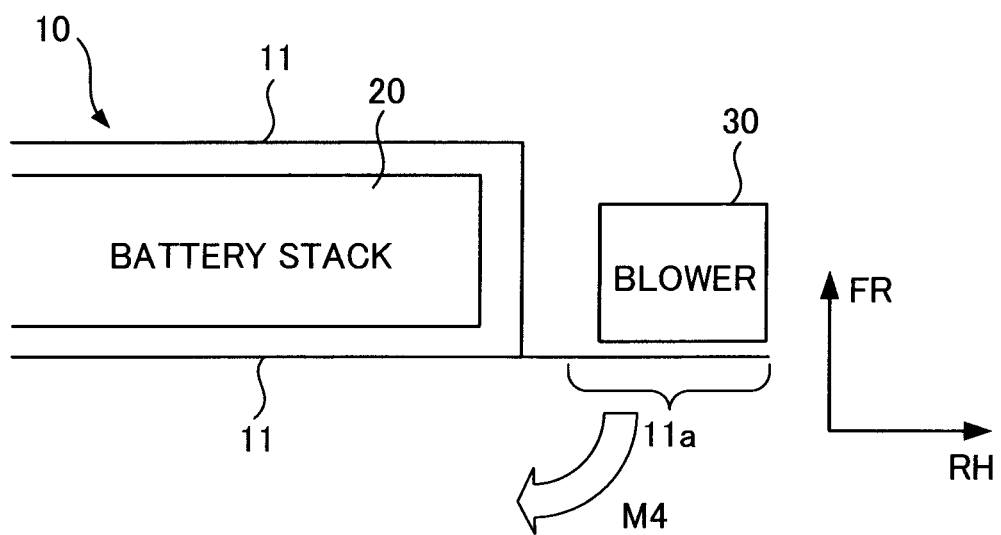
FIG. 11 is a schematic diagram showing a structure for retracting the blower from the battery pack in another modification.

While the pedestal 12a supports the bottom face of the blower 30 in the present embodiment, the blower 30 can be moved as shown in FIG. 11 when a structure for supporting the side of the blower 30 is used. In the structure shown in FIG. 11, the upper case 11 has a pedestal 11a supporting the blower 30. The pedestal 11a corresponds to the pedestal 12a described in Embodiments 1 and 2.

The pedestal 11a extends in an up-down direction of the vehicle 100 and can be deformed in a direction indicated by an arrow M4 when an external force is applied. This allows the blower 30 to be moved toward the rear of the vehicle 100 relative to the battery stack 10. It should be noted that the blower 30 can be moved toward the front of the vehicle 100 relative to the battery pack 10 by changing the deformation direction of the pedestal 11a.

While Embodiments 1 and 2 have been described in conjunction with the use of the so-called square-type cells 21, the present invention is not limited thereto. In other words, the configuration of the assembled battery placed side by side with the blower 30 can be selected as appropriate.

For example, an assembled battery (corresponding to the electric storage unit) employing a so-called cylindrical cell can be used instead of the battery stack 20. The cylindrical cell is formed to have a generally circular section orthogonal to a longitudinal direction. On the other hand, a cell covered with laminate film can be used as the cell 21. When the laminate-type cell is used, an assembled battery (corresponding to the electric storage unit) can be constituted by stacking a plurality of cells.

While the pedestal 12a is formed integrally with the lower case 12 in Embodiments 1 and 2, the present invention is not limited thereto. Specifically, the pedestal 12a can be formed of a member different from the lower case 12 (the portion corresponding to the first area A1). In this case, the pedestal can be fixed to the lower case 12 (the first area A1), or fixed to the floor panel 105. Even when the pedestal is formed of a member different from the lower case 12 (the first area A1), the blower 30 can be moved to a position off the battery stack 20 by deformation of the pedestal as in Embodiments 1 and 2.

The invention claimed is:

1. A vehicle comprising:
    an electric storage unit having a plurality of electric storage elements and outputting energy for use in running of the vehicle;
    a blower placed closer to the exterior of a vehicle body relative to the electric storage unit and supplying the elect storage unit with air for adjusting a temperature of the electric storage element; and
    a pedestal supporting the blower,
    wherein the pedestal has:
        first and second attachment portions configured to attach the blower;
        a bend portion allowing individual movement of the blower to a position off the electric storage unit through deformation in response to an external force;
        a first inclined area extending from the bend portion, connected to the first attachment portion, and inclined with respect to a plane supporting the blower; and
        a second inclined area connected to the second attachment portion and inclined with respect to the plane at an inclination angle larger than that of the first inclined area.

2. The vehicle according to claim 1, wherein the pedestal moves the blower above the electric storage unit through deformation of the bend portion.

3. A vehicle comprising:
    an electric storage unit having a plurality of electric storage elements and outputting energy for use in running of the vehicle;

a blower placed closer to the exterior of a vehicle body relative to the electric storage unit and supplying the electric storage unit with air for adjusting a temperature of the electric storage element; and a pedestal supporting the blower, wherein the pedestal has a bend portion allowing individual movement of the blower to a position off the electric storage unit through deformation in response to an external force and being bent in a shape convex toward a predetermined direction; and a protruding portion provided to be flush with the bend portion and extending in a direction different from a direction in which the bend portion extends, wherein a part of the protruding portion is an extension of the bend portion.

4. The vehicle according to claim 1, further comprising a case including the pedestal and housing the electric storage unit.

5. The vehicle according to claim 1, wherein the plurality of electric storage elements are arranged in one direction, and the electric storage unit and the blower are placed side by side in the direction in which the plurality of electric storage elements are arranged.

6. The vehicle according to claim 1, further comprising a device placed between the electric storage unit and the blower and used in controlling charge and discharge of the electric storage unit.

7. The vehicle according to claim 1, wherein the electric storage unit is placed in space formed below a seat cushion.

8. The vehicle according to claim 3, further comprising a case including the pedestal and housing the electric storage unit.

9. The vehicle according to claim 3, wherein the plurality of electric storage elements are arranged in one direction, and the electric storage unit and the blower are placed side by side in the direction in which the plurality of electric storage elements are arranged.

10. The vehicle according to claim 3, further comprising a device placed between the electric storage unit and the blower and used in controlling charge and discharge of the electric storage unit.

11. The vehicle according to claim 3, wherein the electric storage unit is placed in space formed below a seat cushion.

* * * * *